United States Patent [19]
McConnell et al.

[11] Patent Number: 5,910,929
[45] Date of Patent: Jun. 8, 1999

[54] AUDIO RAILWAY CROSSING DETECTOR

[75] Inventors: Peter R. H. McConnell, Burnaby; Robert A. Scragg, Vancouver, both of Canada

[73] Assignee: Sonic Systems Corporation, Vancouver, Canada

[21] Appl. No.: 09/113,321

[22] Filed: Jul. 10, 1998

[51] Int. Cl.[6] .................................................. G01S 15/00
[52] U.S. Cl. ...................... 367/96; 367/909; 367/100; 367/89
[58] Field of Search ................ 367/96, 909, 151, 367/100, 101, 102, 89; 340/436, 943; 342/69

[56] References Cited

U.S. PATENT DOCUMENTS

| | | | |
|---|---|---|---|
| 3,176,126 | 3/1965 | Vineall | 367/96 |
| 5,774,045 | 6/1998 | Helma et al. | 342/42 |

*Primary Examiner*—Daniel T. Pihulic
*Attorney, Agent, or Firm*—Burns, Doane, Swecker & Mathis, L.L.P.

[57] ABSTRACT

The present invention, generally speaking, provides an acoustic railway crossing detector. The present invention provides a means of not only detecting the presence of a train, but it can determine speed and direction of travel. This allows a more adaptive control of the railway crossing gates and may reduce the nuisance factor of having the gate close too far in advance of the train reaching the crossing. It is also much less susceptible to false activation by natural causes or acts of vandalism. In accordance with one embodiment of the invention, an acoustic railway crossing detector includes at least one acoustic emitter; at least one acoustic detector; multiple reflectors arranged to reflect acoustic energy produced by an acoustic emitter toward an acoustic detector, and control circuitry coupled to an acoustic detector for producing an indication of whether or not a train is present.

6 Claims, 5 Drawing Sheets

**Shunt          Crossing
Detection      Controller
System**

AUDIO RAILWAY CROSSING DETECTOR

BACKGROUND OF THE INVENTION

1. Field of the Invention

The present invention relates to railway crossing detectors.

2. State of the Art

A conventional railway crossing controller is depicted in FIG. 1. The railway crossing controller maintains control of the signal lights and cross bars at the road crossing the railway tracks. It is activated by an electrical "shunt detection system" located some distance from the crossing. This is an electrical system which detects the closed electrical contact of a train crossing a physical location in the tracks. It is nominally located 3000 feet either side of the crossing.

There are several drawbacks to the conventional shunt system. The first is that it cannot give an indication of the trains direction or speed. This can represent a nuisance factor for slow trains where the shunt would close the crossing gates well before the train reached the crossing, possibly causing impatient motorists to try and cross the track in spite of the fact that a train is approaching. This represents a potentially hazardous situation. The other factor is that shunt systems can be falsely activated by conductive material falling across the tracks. This could occur by natural causes or by acts of vandalism.

The railway crossing detector described herein deals only with the detection system and not the interface to existing crossing controllers.

SUMMARY OF THE INVENTION

The present invention, generally speaking, provides an acoustic railway crossing detector. The present invention provides a means of not only detecting the presence of a train, but it can determine speed and direction of travel. This allows a more adaptive control of the railway crossing gates and may reduce the nuisance factor of having the gate close too far in advance of the train reaching the crossing. It is also much less susceptible to false activation by natural causes or acts of vandalism. In accordance with one embodiment of the invention, an acoustic railway crossing detector includes at least one acoustic emitter; at least one acoustic detector; multiple reflectors arranged to reflect acoustic energy produced by an acoustic emitter toward an acoustic detector, and control circuitry coupled to an acoustic detector for producing an indication of whether or not a train is present.

BRIEF DESCRIPTION OF THE DRAWING

The present invention may be further understood from the following description in conjunction with the appended drawing. In the drawing.

DETAILED DESCRIPTION OF THE PREFERRED EMBODIMENTS

Figure 1:
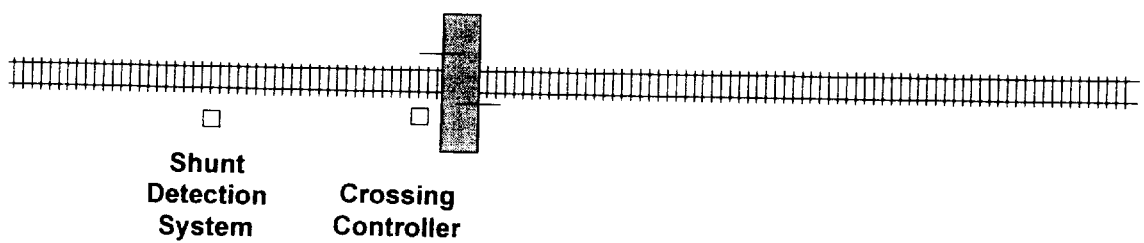
FIG. 1 is a plan view of a conventional railway crossing system.
Figure 2:
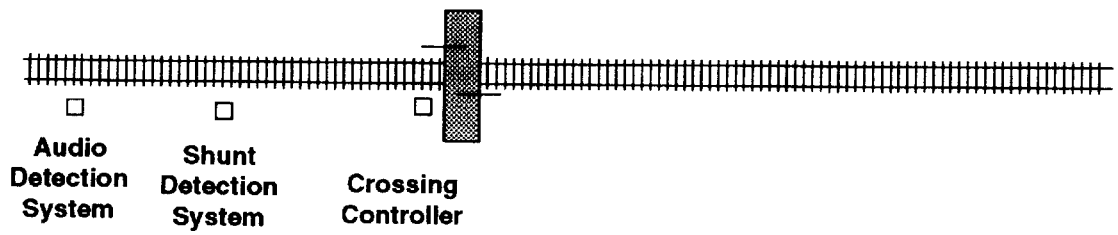
FIG. 2 is a plan view of a railway crossing system in accordance with the present invention.

The present railway crossing system uses audio signal processing techniques in a sonar like fashion to detect the presence of a railway car or engine on a track and to signal the presence of this unit to a railway crossing signalling device such as signalling lights and cross bars. This is depicted in FIG. 1.

The "audio detection system" is a audio based "SONAR" system which can operate at either audible or ultrasonic frequencies. It uses advanced signal processing techniques to detect the rail vehicles crossing a point along the tracks, which is typically further away from the railway crossing than the shunt detection system.

Figure 3:
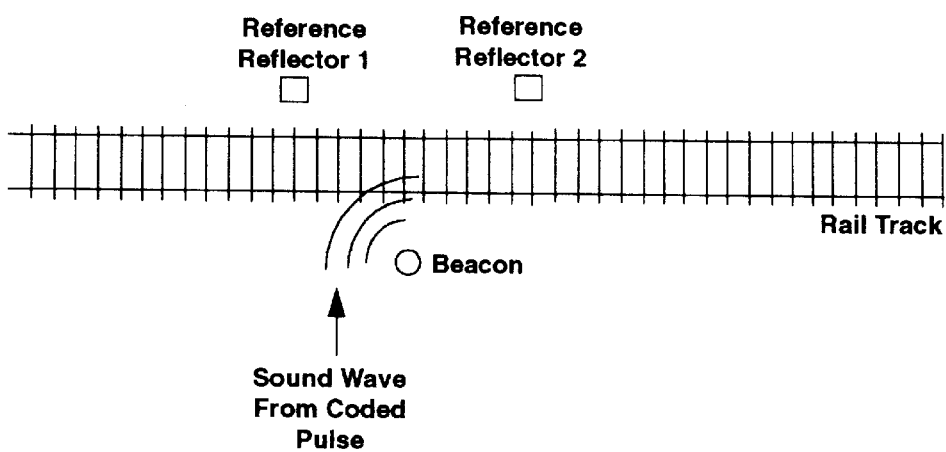
FIG. 3 illustrates in greater detail an acoustic railway crossing system including a track side beacon and reference reflectors.

The system consists of a "beacon" and passive "reference reflectors" located at the track side. The beacon broadcasts "coded" pulses and measures the return signals from objects, including the reference reflector, in the vicinity of the beacon. This is depicted in FIG. 3.

Coded pulses are bursts of audio energy which have very specific signal characteristics. These coded signals are chosen so that they have very good autocorrelation properties. Suitable coding techniques include those used in advanced radar imaging systems and SONAR detection systems, with the specific coding techniques being:

linear FM modulated waveforms, digitally encoded waveforms, also know as Pseudo-Random Number sequences.

The pulses are coded to provide desirable detection characteristics, such as low auto-correlation sidelobes and low cross-correlation with other coded pulses. Using these coded pulses allows the system to operate as a correlation receiver. One of the big advantages of this is that the compression gain afforded by these coded pulses allows the received echoes to detected in ambient sound conditions that are much higher in magnitude than the signal itself.

Figure 4:
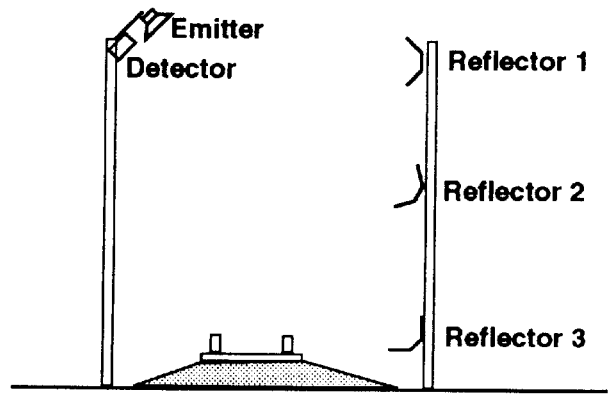
FIG. 4 is a profile view of the beacon and reference reflectors of FIG. 3.

The beacon emits a series of coded pulses at regular intervals. The duration of these pulses would be the order of 0.025 seconds and would occur at the rate of between 20 and 50 times per second. These coded pulses are short bursts of audio energy at either audible or ultrasonic frequencies, with ultrasonic(inaudible) frequencies being preferred. These coded pulses are broadcast by a power amplifier and speaker located at the beacon. These pulses are directed towards a reference beacon on which three reflective surfaces are mounted. This is depicted in FIG. 4.

The beacon consists of an emitter which sends the codes pulses at regular intervals, and a detector to receive the pulses which are reflected from objects in the vicinity of the beacon. The reference reflector has three fixed "retro-reflectors" spaced at different heights on the mast. These serve to reflect the codes pulses back to the detector, and have the following purposes;

1. They provide three reference reflections for the detection system.
2. The top reflector (reflector 1) is sufficiently high above the ground that it will never be blocked by a passing train. As long as the detector "sees" reflections from this reflector or target, the system can always determine it is operating properly.

3. The other two reflectors (reflectors 2 and 3) are used to determine the presence of a rail engine or car on the track. If reflections from these disappear, then it is safe to assume that a train is on the track and the crossing controller should be alerted as to this occurrence.

4. Because the reflectors are of known sizes, they provide reference reflection magnitude levels. These are useful in determining the approximate physical size of any object in the region of the beacon.

Like a land based SONAR system, the acoustic railway crossing system sends out an acoustic PING and detects the reflected sound echoes from objects in the path of the emitter. The larger the object, the larger the reflected sound energy. Also, the longer the delay between the time the PING is sent and the return echo, the further the object is away from the emitter that broadcast the PING.

In an exemplary embodiment, the pulse coding is performed using either a linear FM or a binary pulse coding technique with a binary frequency shift keying modulation scheme. With the linear FM of "chirp" technique, the frequency of the pulse is swept from one frequency to another in a linear fashion. With the latter scheme, a binary one is sent as one frequency (f1) and a binary zero is sent as another frequency (f2). The binary coded pulse consists of a string of binary digits (a codeword) which have very specific properties, these being:

the auto-correlation sidelobes should be as low as possible. If, for instance, the length of the codeword is 64 bits, the auto-correlation sidelobes should have a normalized magnitude of 0.016 to 0.032.

for a codeword of length N, there are $2^N$ possible codewords. A few codewords from this family should be chosen such that they have the lowest possible cross-correlation coefficients.

there is a very low cross-correlation between the coded pulse and any naturally occurring sounds, sounds as wheel clicks from the train wheels or the engine noise.

the is a coding gain provided by the pulse coding, which allows the system to operate in high noise environments.

The beacon transmits pulses at regular intervals and then receives the reflections from objects in the vicinity of the beacon some time later. Since the system is operating as a correlation receiver, the detector outputs consist of "spikes", with each spike having the following characteristics:

the time delay between pulse being sent out and the reflection being received is the total round trip time it takes the pulse to go from the emitter to the reflector, and from the reflector back to the detector.

the "magnitude of the spike is proportional to the "scattering cross-section" of the object reflecting the sound.

Figure 5:
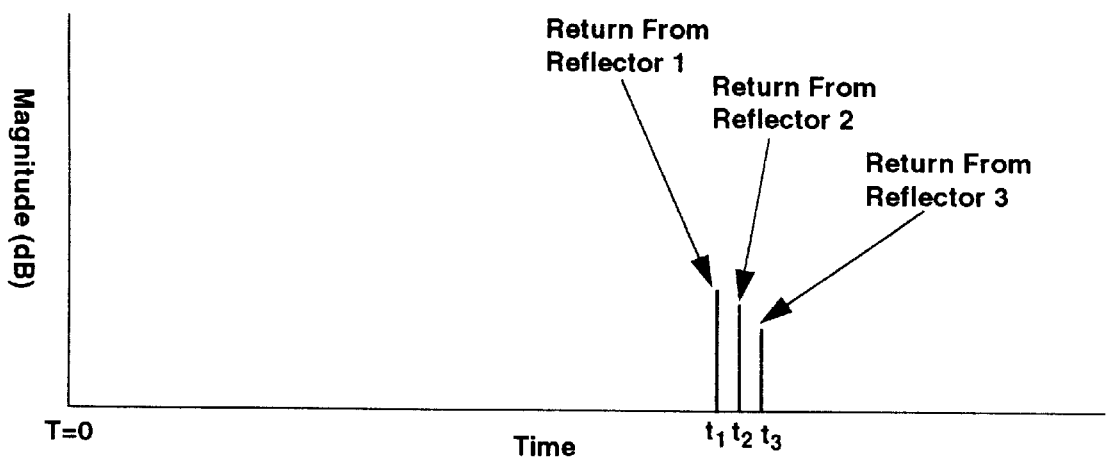
FIG. 5 is a waveform diagram of an ideal echo return from a passive retroreflector.

Considering only the reflections from the three retro-reflectors shown in FIG. 4, then the "ideal" correlation detector output would appear something like that shown in FIG. 5. The echo return from reflector 1 occurs before the other two reflectors because the distance between the beacon and reflector 1 is less than that for the other two reflectors. Also, the magnitude of the return from reflector 1 is greater than that of the other two because there is less sound attenuation. The reflectors are placed at such a height that a boxcar, tank car, or engine passing between beacon and the reflector will block reflectors 2 and or 3 but not 1. This is done for the following reason:

the system uses the echo from reflector 1 to ensure that it is functioning correctly. Since this echo path should never be blocked, it should always be present.

echoes from reflectors 2 and 3 should only disappear if the path between the emitter and the reflectors is blocked.

Figure 6:
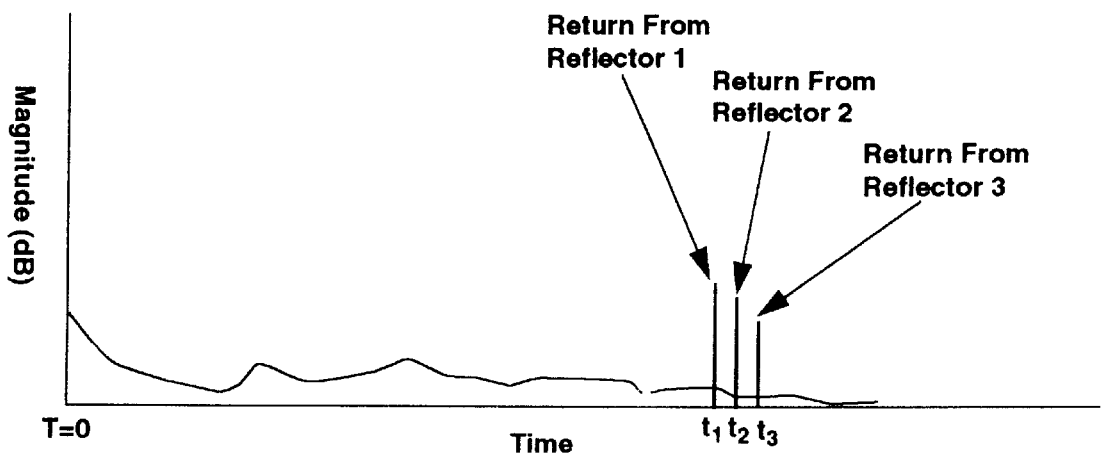
FIG. 6 is a waveform diagram of a possible real-life echo return without a train on the track.

In real-life, the correlation detector output will contain other echo returns in addition to those for the three corner reflectors. This will be due to returns from the road bed area and any other objects in "view" of the beacon. A more realistic echo return may look that the example shown in FIG. 6. This shows the case where there is no train on the track.

If a train were present, the following signal characteristic would be expected:

Reflections from reflectors 2 and/or 3 would be lost.

There would be a large reflection from the side of the train at a time less than t1. This would also provide the range to the side of the train.

Figure 7:
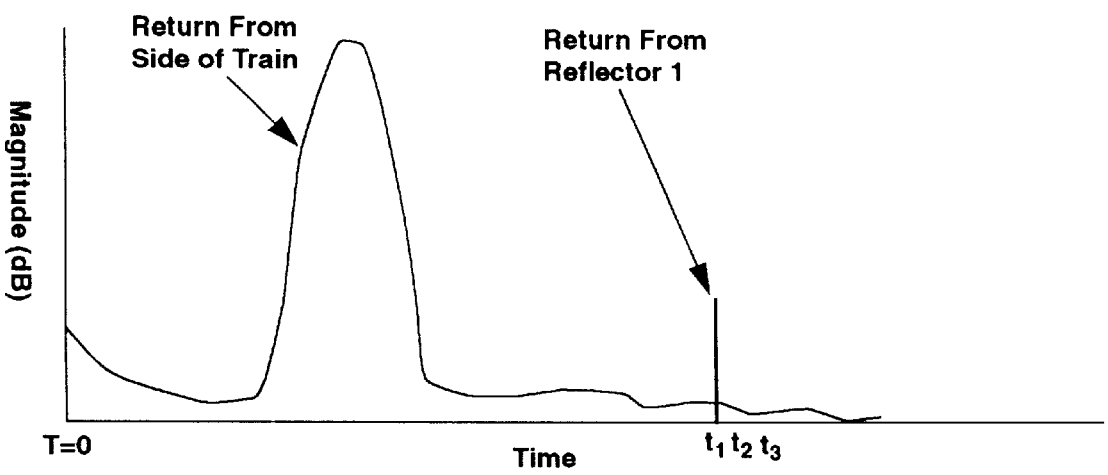
FIG. 7 is a waveform diagram of a possible real-life echo return with a train on the track.

An example of this is shown in FIG. 7. By performing an operation called time gating of the return echoes, only echo returns from specific areas of interest would be analyzed. This would increase the reliability of the system.

An extension to the foregoing techniques allows the direction of travel and an estimate of the velocity to be made. This extension requires the presence of a second passive reflector. The beacon and passive reflectors may be configured as was shown in FIG. 3. The beacon simultaneously sends coded pulses to reflectors 1 and 2. The pulse sent to reflector 1 has a code that is "orthogonal" to that of the pulse sent to reflector 2. When a vehicle passes the beacon from reflector 1 to reflector 2, the system sees the "event" from reflector 1 occur before the "event" from reflector 2. If the vehicle were going in the opposite direction, then the system would see the "event" from reflector 2 occur before the "event" from reflector 1. As long as the distance between reflector 1 and 2 is known and remains constant, then the velocity estimate for the vehicle is the distance between the reflectors divided by the time difference between the events. In order to obtain echoes from reflectors 1 and 2, the system has two emitter/detector pairs (not shown). One of the pair is aimed at reflector 1 and the other is aimed at reflector 2.

EXAMPLES

Figure 8:
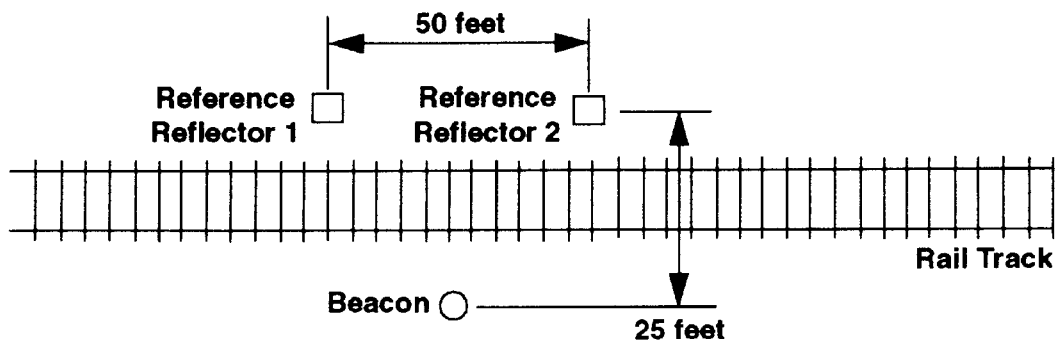
FIG. 8 is a profile view of one specific acoustic railway crossing system.
Figure 8:
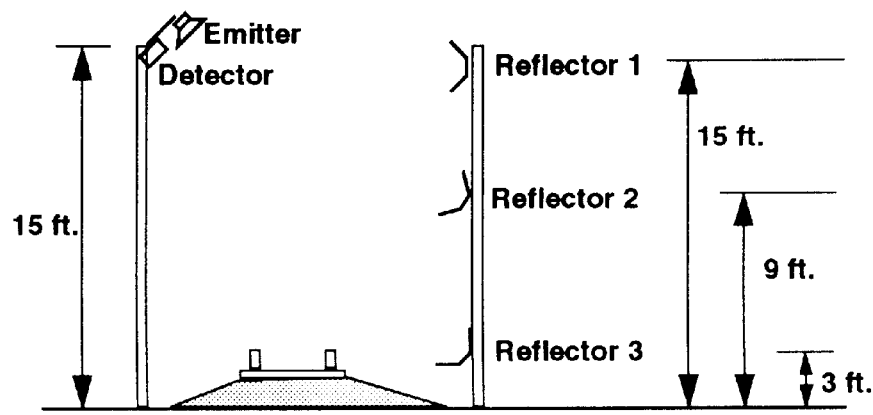

The following examples are provided in reference to a particular system configuration shown in FIG. 8, having the following characteristics:

Beacon to reflector 1 distance=35.35 feet

Beacon to reflector 2 distance=35.85 feet

Beacon to reflector 3 distance=37.33 feet

RTT[1] from beacon to reflector 1=104 msec

RTT from beacon to reflector 1=105.5 msec

RTT from beacon to reflector 1=109.8 msec

1. RTT=Round Trip Time

Case 1—1000 BPS Binary PAM

Use a data rate of 2000 bps, then a 32-bit codeword has a duration of 16 msec (5.44 meters). This pulse can detect something as close as 2.7 meters (8.8 feet) from the beacon. Some of the technical aspects of this signalling scheme are:

Symbol period of 500 $\mu$Sec. This corresponds to a distance of about 0.55 feet or 0.17 meters.

Best spatial resolution of a about 0.55 feet or 0.17 meters.

3 dB baseband bandwidth of about 1 kHz.

Choosing as a coding sequence one of the known 32-bit Lindner sequences, which has a maximum sidelobe value of 3, provides about 20 dB radiometric resolution.

Case 2—Linear FM Chirp

Assume a bandwidth of 2000 Hz. With frequency domain weighting, the following characteristics result:

A resolution of 800 μSec. This corresponds to a distance of about 0.88 feet or 0.27 meters.

Best spatial resolution of a about 0.55 feet or 0.17 meters.

Time Bandwidth Product of about 50.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. An acoustic railway crossing detector, comprising:

at least one acoustic emitter;

at least one acoustic detector;

multiple reflectors arranged to reflect acoustic energy produced by said at least one emitter toward said at least one detector; and control means coupled to the at least one acoustic detector for producing an indication of whether or not a train is present.

2. The apparatus of claim 1, wherein at least one of the multiple reflectors is positioned so as to reflect acoustic energy toward an acoustic detector regardless of whether or not a train is present.

3. The apparatus of claim 1, wherein said at least one acoustic emitter produces a coded acoustic pulse train.

4. The apparatus of claim 3, comprising multiple acoustic emitters and multiple acoustic detectors, wherein the multiple acoustic emitters produce coded acoustic pulse trains having substantially orthogonal coding sequences.

5. The apparatus of claim 4, wherein a first one of the reflectors and a second one of the reflectors are separated by a distance in a direction travelled by a train.

6. The apparatus of claim 5, wherein the control means is coupled to the multiple acoustic detectors and produces an indication of at least one of a direction of a train and a speed of the train.

* * * * *